United States Patent [19]

Baker et al.

[11] 4,446,024
[45] May 1, 1984

[54] HOLLOW FILAMENT PRODUCT

[75] Inventors: Richard A. Baker, Newark, Del.; George D. Forsythe, Landenberg, Pa.; Kewal K. Likhyani, Wilmington, Del.; Robert E. Roberts, Kennett Square, Pa.; David C. Robertson, Bear, Del.

[73] Assignee: E. I. Du Pont de Nemours & Company, Wilmington, Del.

[21] Appl. No.: 103,201

[22] Filed: Dec. 13, 1979

Related U.S. Application Data

[60] Continuation of Ser. No. 872,665, Jan. 22, 1978, abandoned, which is a division of Ser. No. 770,461, Feb. 22, 1977.

[51] Int. Cl.³ .................................................. B01D 31/00
[52] U.S. Cl. .............................. 210/500.2; 210/321.1; 210/433.2
[58] Field of Search ............ 55/158; 264/59, DIG. 44; 210/500 M, 23 H, 321 R, 321.1, 433.2; 106/62

[56] References Cited

U.S. PATENT DOCUMENTS

| | | | |
|---|---|---|---|
| 2,171,006 | 8/1939 | Morgan et al. | 264/59 |
| 3,262,251 | 7/1966 | Hicks, Jr. | 55/158 |
| 3,385,915 | 5/1968 | Hamling | 106/62 X |
| 3,422,008 | 1/1969 | McLain | 210/22 |
| 3,755,034 | 8/1973 | Mahon et al. | 156/169 |
| 3,794,468 | 1/1974 | Leonard | 23/258.5 |
| 4,017,347 | 4/1977 | Cleveland | 264/59 X |

FOREIGN PATENT DOCUMENTS

| | | | |
|---|---|---|---|
| 2422477 | 8/1974 | Fed. Rep. of Germany | 210/500.2 |
| 463430 | 4/1939 | United Kingdom | 210/500.2 |
| 1337137 | 11/1973 | United Kingdom | 210/500.2 |

OTHER PUBLICATIONS

Morgan et al., Engineering Notes, "Preparation of Ceramic Forms Using a Removable Mandrel", vol. 54, No. 9, 1975, p. 797.

*Primary Examiner*—Frank A. Spear, Jr.

[57] ABSTRACT

A three-dimensional network of rigid, porous hollow filament of inorganic material is provided which has high flux capability in treating fluid for separation purposes. The network is made by coating a continuous combustible core with a paste of the inorganic material, fabricating the resultant coated core into the network, followed by firing the coated core to burn off the core and sinter the coating to rigid porous hollow filament.

11 Claims, 16 Drawing Figures

HOLLOW FILAMENT PRODUCT

CROSS REFERENCE TO RELATED APPLICATIONS

This application is a continuation of our prior co-pending application Ser. No. 872,665, filed Jan. 22, 1978, now abandoned, which is in turn a division of our prior application Ser. No. 770,461, filed Feb. 22, 1977.

BACKGROUND OF THE INVENTION

This invention relates to a self-supporting unitary assemblage of criss-crossing rigid, porous, inorganic hollow filaments which can be used in such pressure-driven separation applications as ultrafiltration, hyperfiltration, and reverse osmosis.

Wound structures of criss-crossing flexible organic polymer hollow filaments are disclosed in U.S. Pat. Nos. 3,422,008 and 3,794,468 for such separation applications as ion exchange, reverse osmosis, wherein dissolved material is separated from the liquid (solvent) feed, and gas diffusion. The flexibility of these filaments which enables them to be wound up in criss-crossing fashion also limits the usefulness of the resultant structure in the separation application. For instance, when the separation is pressure driven; i.e., depends upon a pressure differential between the filament interior and exterior, the filament tends to collapse. Collapse resistance is obtained by making the filaments very fine, e.g., 0.005 inch (0.127 mm) and less, but this leads to plugging of the interior passage within the filament and moreover the filament is still subject to collapse when the pressure differential is increased to boost the flux (flow rate of liquid permeate or filtrate through the wall of the filament per unit of filtration surface area) of the separation process. Heat, chemical, and erosion resistance are also limitations on the use of the structures of organic polymer hollow filaments.

Rigid, porous, inorganic hollow tubes, such as of porcelain as disclosed in U.S. Pat. No. 3,664,507 or of carbon and alumina as disclosed in German OLS No. 2,422,477 which are capable of withstanding high pressure differentials and which overcome the heat, chemical, and erosion limitations of the organic hollow filaments have been developed for pressure-driven separation applications including those in which solid (undissolved) material is separated from the liquid feed. In both these references, the tubes are straight tubes, supported at one end in U.S. Pat. No. 3,664,507 and at both ends in German OLS No. 2,422,477. Such tubes are rigid, a property which enables them to withstand high pressure differentials without collapsing, but which has also limited the use of these tubes as straight lengths only. These straight lengths of tube limit the closeness with which the tubes can be packed together without blocking liquid from flowing to or from the thickness of the tube through which the separation operation occurs. In addition, the straight lengths of tube are brittle and lack toughness, which has to be compensated for by making the tubes of rather heavy construction, i.e., large diameter and wall thickness. For example, tube of 0.25 inch (6.35 mm) I.D. and a wall thickness of 0.06 inch is preferred in OLS No. 2,422,477 and 0.21 inch (5.33 mm) O.D. tube is disclosed in U.S. Pat. No. 3,664,507. The limitation on tube packing and requirement of heavy tube construction provides a relatively low tube surface area per unit of volume, which means that rather large equipment is needed to house the tubes, depending on the surface area required for a particular application. The heavy construction of the tube also has to compensate for the weakening effect of the pores that must be present in the tube wall for the permeation of liquid therethrough, and the porosity of the tube must be limited accordingly.

The relatively heavy construction of the straight tubes is generally a compromise between the sacrifice in surface area per unit of volume and porosity and the strength needed for handling and use, which still requires great care in the handling and use of the tubes in order to avoid breakage. In this regard, the tubes are generally supplied separate from one another in the sense that they are individually inserted into the separation equipment. This separate handling of straight tubes is a delicate operation which can lead to tube breakage and added cost.

The relatively heavy construction of the tubes also has to compensate for the mounting arrangement of the tubes within the separation equipment. In this regard, the tubes are mounted to extend in cantilever fashion from a tube sheet and may be supported at their opposite ends. In any event, the tubes are subject to flexure and breakage by the liquid flowing through the equipment. This limits the lengths of the tubes that can be used. It is also usual for the liquid flow when supplied from the exterior of the tubes to be along the axis of the tubes, rather than transverse thereto, to minimize tube flexure and breakage. Liquid flow supplied to the interior of the tubes is also along the axis of the tubes to minimize tube flexure.

In the ultrafiltration application, the straight rigid, porous, inorganic hollow tubes have shown another disadvantage. In this separation application, a measure of efficiency is the consumption of power used in pumping liquid along the filter surface (rather than pressure differential between the interior and exterior of the tube) vs. the amount of filtrate collected of desired quality for this power consumption. For a given set of process conditions, the operating flux of the straight tubes becomes very low, with the result that the power consumed for the amount of filtrate obtained is higher than desired. By "operating flux" is meant the flux of the tubes after the initial sharp decrease in flux occurs at the beginning of the ultrafiltration and the separation system is considered to be operating. The operating flux declines more gradually than this initial sharp decrease in flux. Although operating flux decline is gradual, such flux eventually reaches the point where it becomes economical to even stop the filtration operation in order to backwash the tubes, which improves the operating flux but only temporarily. The ability to retain the initial flux of the operating flux is called flux retention. The straight tubes generally have a low flux retention. Flux retention may be high, however, if the operating flux is so low to begin with that there is little room for decrease in flux with the passage of time.

The low operating flux and/or poor flux retention of the straight tubes is due to the buildup of particulate matter from the liquid being filtered on the tube surface and buildup of a stagnant fluid boundary layer on the tube surface. The generally axial flow of the liquid used in connection with these tubes so as not to break them is a relatively laminar flow of liquid. This laminar flow is not very effective in washing away the buildup of particulate matter or stagnant fluid boundary layer. The same is true for the buildup of the boundary layer of liquid concentrate when the straight tubes are used for hyperfiltration or reverse osmosis.

D. G. Thomas et al., "Turbulence Promoters for Hyperfiltration with Dynamic Membranes", Environmental Science and Technology 4, 1129–1136, Dec. 1970, disclose the use of devices preferably mounted within the interior of straight porous carbon tubes for promoting turbulence in the flow of liquid fed to the hollow interior of the 0.39 inch (9.9 mm) O.D. tubes (wall thickness of 2 mm), which had the effect of increasing the flux of the tubes (including the dymanic membrane formed thereon) by as much as 150% for the particular system tested. Unfortunately, the economics of operating these tubes with turbulence promoters is less than desirable because of the need to make the tubes large enough to fit the turbulence promoters inside them, which detracts from surface area per unit of volume, and the turbulence promoters themselves act as sites for buildup of particulate matter, which detracts from the surface of the tubes available for filtration and eventually may lead to the shutting down of the filtration operation for replacement of the turbulence promoters.

R. E. Lacey and S. Loeb, *Industrial Processing with Membranes*, published by Wiley-Interscience (1972) disclose on pages 257 to 259 a belief that velocity of the fluid (liquid) can minimize the deposition of a boundary layer of ionic and collodial materials that decrease flux and advance a concept of a staggered membrane configuration which provides impinging flow and which breaks up the flow before buildup of a stable boundary layer. The authors note that the membrane support configurations which provide flow break up were not observed in the literature (page 258) and do not make any proposals for such configurations themselves. The authors also note the disadvantage of inserted turbulence promoters and say "A new and fresh approach is needed" (page 259).

SUMMARY OF THE INVENTION

The present invention provides the new and fresh approach and overcomes the aforementioned disadvantages of straight rigid porous inorganic tubes, as will be explained hereinafter.

The present invention can be described as a self-supporting, unitary structure comprising rigid, porous, inorganic hollow filament arranged in a three-dimensional network of criss-crossing hollow filament through the thickness dimension of the network, the criss-cross pattern of the hollow filament extending in the length-width dimensions, the three-dimensional network of said hollow filament defining tortuous paths for fluid communicating through the thickness dimension of the network.

Preferably, the three-dimensional network is a spiral wound structure of the hollow filament in multiple layers, the hollow filament in each layer being spaced apart, with adjacent layers being in contact with one another, but the hollow filament in one of the adjacent layers crossing the hollow filament in the other layer of the adjacent layers and so on through the thickness dimension of the wound structure. The hollow filament wound in the same direction in the structure is sufficiently offset from layer to layer so as to provide the aforesaid tortuous paths. In addition, the hollow filament forming one of the layers of the structure preferably continues on into another layer of the structure. This extending of the hollow filament in the thickness dimension of the network as well as the containment of all preceding layers by each succeeding layer promotes the unitary nature of the structure. The hollow form of the rigid, porous, inorganic material in the present invention is referred to as a filament rather than as a tube as in the prior art because of the smaller outside diameter, e.g., no greater than 0.125 inch (3.18 mm), and generally longer length and curvilinear path of the hollow filament in the present invention. The entire network can be made of a single hollow filament.

The small outside diameter of the hollow filament and the fact that they can be packed in contact with one another in criss-cross relationship without loss of surface for the separation application provides the advantage of high surface area per unit of volume (packing) for the present invention. For example, a packing of at least 150 ft$^2$/ft$^3$ (at least about 490 m$^2$/m$^3$) and preferably at least 200 ft$^2$/ft$^3$ (at least about 650 m$^2$/m$^3$) can be provided by the present invention.

Despite the small size of the hollow filament and the attendant small wall thickness thereof, the hollow filament can be handled and used without breakage. This is because the hollow filament is in the form of the network which is a unitary structure and is handled as such instead of as individual lengths of filament. The network structure is in a sense a cartridge that can easily be inserted into separation equipment.

By "tortuous paths" in the network is meant that the hollow filament is in an offset (out of register) relationship through the thickness dimension of the network. The flow interruption and division of the fluid caused by the tortuous paths can be used to produce turbulence in the fluid, depending on the flow rate and viscosity of the fluid, which in turn increases the efficiency of the separation application which can be expressed in terms of more permeate (filtrate) for a given consumption of power or higher operating flux, without any sacrifice in filtrate quality. For example, an improvement in flux of more than six times by the present invention will be shown in Example 1. The operating flux is also sufficiently steady that the high flux extends over a long period of operation without the need for interrupting the operation for backwashing or the like. Thus, the network of the present invention also has a high flux retention.

The present invention constitutes a departure from the prior art practice of using independent turbulence promoters to increase turbulence in the liquid. In the present invention, turbulence promotion in the liquid and even in a gas feed is achieved by the network arrangement of the hollow filament itself which defines the tortuous paths for fluid flow through the network.

Surprisingly, the long, lightly constructed hollow filament of the network can be subjected to the force of liquid cross (transverse) flow, and also high pulsations of liquid force encountered in some applications, without the filament breaking. This resistance to breakage is necessary for the hollow filament of the network to withstand the transverse liquid flow necessary for obtaining turbulent flow of the liquid even at flow rates that produce primarily laminar flow in the prior use of straight inorganic hollow tubes and at higher flow rates if desired. This resistance to filament breakage is due at least in part to the hollow filament supporting itself at each crossover point within the network. Even high apparent porosities, e.g., at least 35%, can be present in the wall of the hollow filament, to increase the flux of the hollow filament, without leading to breakage of the hollow filament.

The present invention has the advantages over wound structures of organic polymer hollow filament of being operable at higher pressure differentials without plugging, higher temperatures, and being more chemically and erosion resistant. For example, in the desalination of water, the present invention can be operated at high pressure differentials such as 1200 psi (about 8300 kPa) and higher and elevated temperatures such as 40° C. and higher which increase the permeate flux and separation efficiency, which conditions are not possible with organic polymer hollow filament.

The network of the present invention, however, cannot be made by the winding of hollow filament as in the organic polymer hollow filament art because the hollow filament of the present invention is rigid. By "rigid" is meant that the hollow filament is sufficiently stiff that it can not be formed into, or straightened out from, a curved path such as is encountered in filament winding, without breaking. The hollow filament, however, has some slight flexibility which varies with outer diameter and wall thickness and which adds to the toughness of the hollow filament in the network as will be explained later herein. The rigidity of the hollow filament also provides corresponding rigidity and integrity to the network and makes it self-supporting. In contrast, the wound structures of organic polymer hollow filament are not self-supporting; they are maintained on and supported by a core which adds to their expense and interferes with their use.

Since the inorganic hollow filament is rigid, it cannot be fabricated as such into the network such as the spiral wound structure hereinbefore described. Thus, the present invention includes the discovery of how to make the three-dimensional network of the hollow filament, overcoming the fabrication problem presented by the rigidity of the hollow filament and the problem of obtaining the rigid, fine filament (of inorganic material) with a continuous hollow interior.

DETAILED DESCRIPTION

The hollow filament structure of the present invention can be made by coating a continuous combustible core with a paste of sinterable composition to form filament of the coated core, fabricating the filament into the three-dimensional network and firing the resultant network to burn out the core and sinter the coating of sinterable composition, thereby providing rigid, porous, hollow filament in the network arrangement. The sinterable composition is one which sinters to the inorganic material which makes up the hollow filament. Further details on composition will be given later herein.

Figure 1:
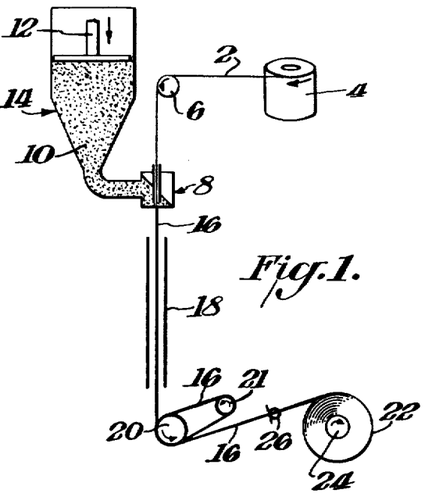
FIG. 1 shows a schematic view of apparatus for making a three-dimensional network of hollow filament of the present invention.

FIG. 1 shows coating and fabrication steps. More specifically, textile yarn 2 as the continuous combustible core is unwound from a package 4, passed over guide roll 6 and into an extrusion die 8 which is supplied by a paste 10 of the sinterable composition by the pressure of a ram 12 of a ram extruder 14. The paste is desired in the ram extruder. The paste 10 envelops the yarn 2 to thereby form a coating on it and exits the extrusion die 8 as a coated yarn 16. The coated yarn 16 passes through a hood 18 and makes several wraps around rolls 20 and 21 before being spirally wound up as a cylinder 22 on rotating mandrel 24. The several wraps of the coated yarn 16 about rolls 20 and 21 enable these rolls to pull the textile yarn 2 under light tension from its package and through the extrusion die 8. The yarn 2 passes through a tensioning device prior to entering the die 8 so as to lightly tension the yarn sufficiently to eliminate any flutter in the yarn as it passes through the die. The ram 12 is operated to provide a continuous coating of the paste 10 about the yarn as the yarn leaves the extrusion die.

In the windup on mandrel 24, the coated yarn 16 passes through a guide 26 which traverses the mandrel from end to end to wind the coated yarn in multiple layers in criss-cross relationship from layer to layer. This forms a three-dimensional network of coated yarn 16, with the pattern of criss-crossing coated yarn extending in the length-width dimensions of the cylinder and the thickness dimension being built up of criss-crossing coated yarn.

Figure 2:
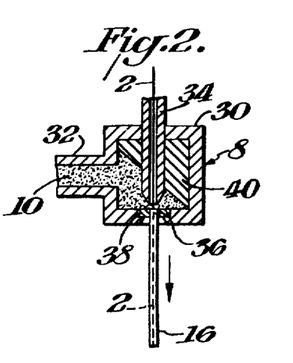
FIG. 2 shows a cross-section view of the extrusion die used in the process of FIG. 1.

FIG. 2 shows the extrusion die in greater detail, consisting of a housing 30 having an inlet 32 for the paste composition 10 from the ram extruder. A yarn guide tube 34 extends into the die housing 30 for receiving the yarn 2 and guiding it through the center of the extrusion orifice 36 formed in a wear resistant insert 38 such as of diamond in the housing 30. The exit end of the tube 34 is short of the orifice 36 and tapers towards the orifice. A deflector 40 within the housing 30 urges the paste composition 10 towards the orifice 36 and around the yarn 2 exiting the tube 34 and eliminates "dead" space within which composition can stagnate and dry out within the die. Coating of the yarn 2 takes place at the exit from the tube 34 and coated yarn 16 emerges from the extrusion orifice. The die length (height in FIG. 2) is small, e.g., 2.5 cm interior length, in order to minimize flexure of the guide tube 34. The ends of the die which contain the guide tube and extrusion orifice can be made separate from the housing and secured therein by threading, which enables guide tube diameter or orifice diameter to be changed by merely changing an end of the housing 30.

After the cylinder 22 of coated yarn 16 is fabricated in the number of layers desired, the cylinder is slipped off the mandrel, dried if necessary and then fired. The firing burns out the yarn and sinters the coating into rigid hollow filament in the same three-dimensional disposition as the wound-up layers of coated yarn. During this firing, the porosity desired in the wall of the hollow filament is developed.

Figure 3:
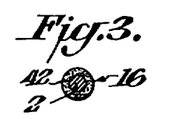
FIG. 3 shows in cross-section the coated core obtained from the process of FIG. 1.
Figure 4:
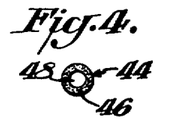
FIG. 4 shows in cross-section the hollow filament obtained from the coated core of FIG. 4.

FIG. 3 shows the cross section in enlargement of the coated yarn 16 showing the yarn 2 in the center surrounded by a continuous coating 42 of the paste composition. FIG. 4 shows the cross section after sintering, which leaves a hollow filament 44 consisting of a porous wall 46 encircling passage 48 in the interior of the filament. The wall 46 and passage 48 are continuous along the length of the hollow filament.

Figure 5:
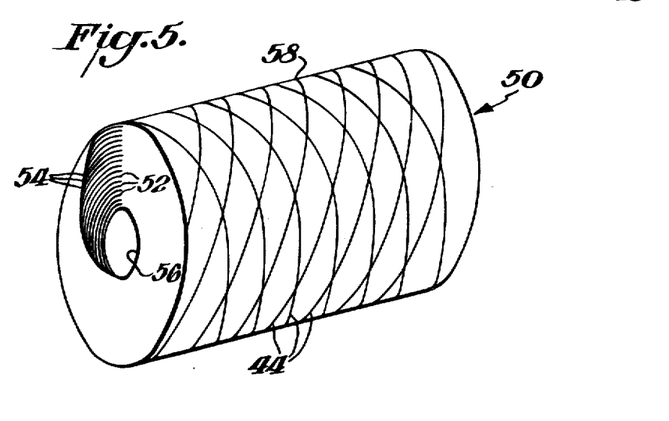
FIG. 5 shows in schematic perspective view the three-dimensional network obtained from the process of FIG. 1.

FIG. 5 shows the self-supporting unitary cylindrical structure 50 which is a three-dimensional network of rigid porous inorganic hollow filament 44 obtained by firing the cylinder 22. FIG. 5 also shows the criss-cross pattern of this filament 44 extending in the length and width dimensions of the structure and the buildup of multiple layers 52 of the filament in the thickness dimension. The hollow filament of one layer extends in the thickness dimension of the structure to the next outermost layer to interconnect the layers, the interconnections being shown as 54 in FIG. 5. The layer of hollow filament corresponding to the first winding of coated yarn 16 forms the interior surface 56 (bore) of the cylindrical structure 50 and the layer of hollow filament corresponding to the last wound layer of coated yarn 16 forms the exterior surface 58 (circumference) of the cylindrical structure.

The rigidity of the sintered hollow filament together with the compactness of the network arrangement, i.e., the layers of hollow filament are in contact with one another, and the continuity of filament from one layer to the next, imparts relative rigidity and integrity to the overall network and makes it self-supporting and unitary. Each point where a length of hollow filament crosses over another length of hollow filament represents a support for both lengths of hollow filament and this support is repeated along each length at each crossover point.

As shown in FIG. 5, the criss-crossing hollow filament 44 in the outer two layers of the cylindrical structure 50 are spaced from each other in each layer to provide space for entry of liquid into the thickness of the three dimensional network of hollow filament. The hollow filament in preceding inner layers that run in the same direction as one of these two outer layers is offset from the outer layers. The combination of criss-crossing filament and offset filament interrupts and divides the flow of liquid passing between surfaces 56 and 58 rendering this flow much more turbulent than flow of a liquid along the axis of a straight tube.

Figure 6:
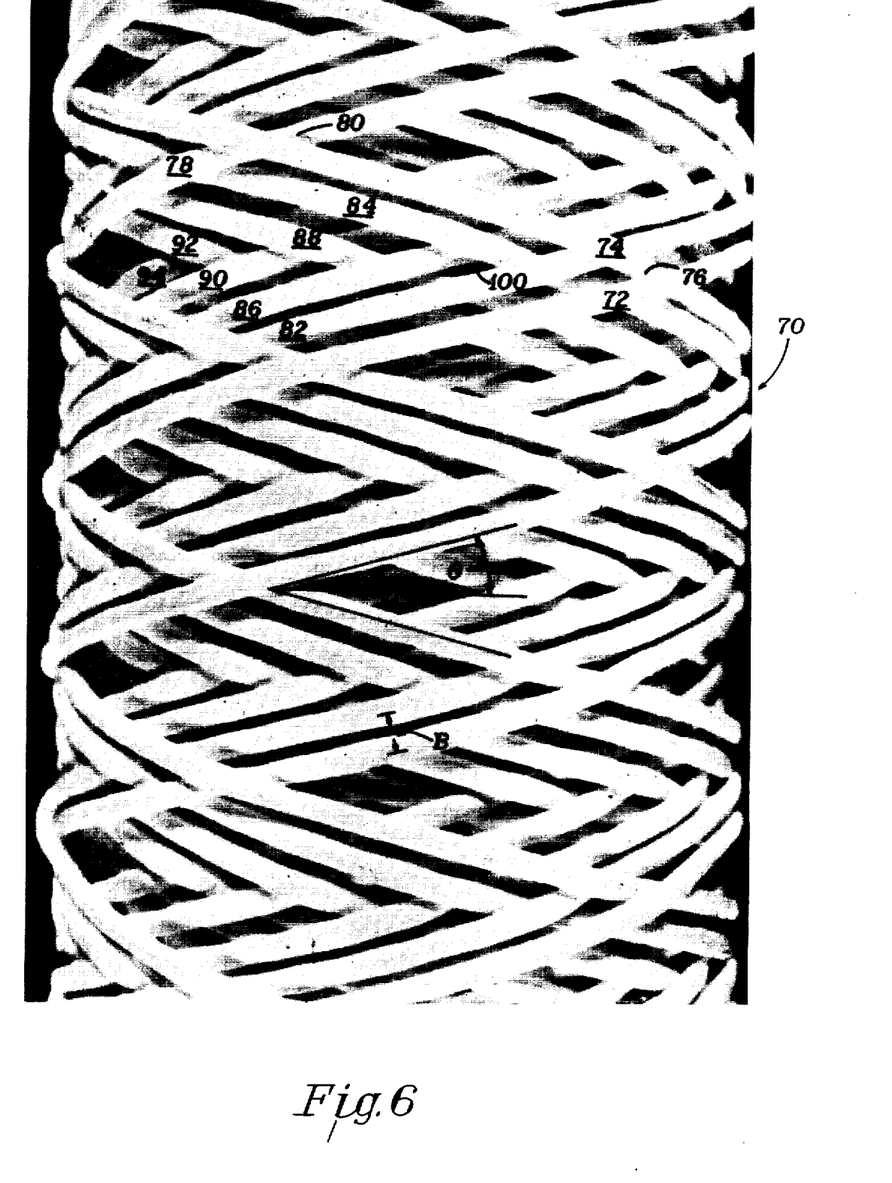
FIG. 6 shows a photographic enlargement of a portion of the length-width dimensions of a three-dimensional network of the present invention.

The criss-cross pattern of rigid hollow filament may be better understood by reference to the embodiment of this pattern shown photographically in about 3.5X magnification in FIG. 6 for wound cylindrical structure 70. In this embodiment, hollow filament 72, which has an O.D. of 0.06 in. (1.5 mm), represents the outer layer of the cylindrical structure 70. Hollow filament 74 represents the next preceding layer running across the spiral path of hollow filament 72. It will be noted that hollow filament 74 is in contact with and thus supports hollow filament 72 at crossover point 76 in the field of view of the photograph. Hollow filament 78 forms the next preceding layer, wound in the same direction as hollow filament 72 and supporting hollow filament 74 at crossover point 80. Hollow filament 82, 84, 86, 88, 90, 92, 94, and 96 represent the next preceding layers in the order named, this particular criss-cross winding pattern for the original coated yarn involving twelve layers. This criss-cross pattern can be repeated through the thickness of the three-dimensional network for the number of layers desired. Hollow filament 74, 84, 88, 92, and 96 run in the same direction and are all offset from one another to interrupt and divide up the flow of liquid fed to this surface of the network. The same is true for hollow filament 72, 82, 86, 90, and 94.

It should be noted that the above described "layers" do not necessarily comprise concentric layers for the length of the hollow filament. Hollow filament 88 is closer to the center of the cylindrical structure above hollow filament 94 than when above filament 90. In other words, the hollow filament in one layer can dip down into one or more preceding layers, depending on the particular winding pattern used on the coated yarn precursor to the hollow filament. Also, since crossover points are not located at the same point, the thickness of the cylindrical structure is less than the product of the number of layers and hollow filament outer diameter.

Although not visible in this photograph of FIG. 6, there are hollow filaments below the surface running parallel with hollow filaments 74, 84, 88, 92, and 96 (also with the cross direction hollow filaments) located between the visible adjacent hollow filaments (e.g., 72 and 82) so that there is no straight through path for liquid through the thickness of the cylindrical structure. In use, liquid can flow from the outside of the cylindrical structure through the aperture 100 until the flow is diverted by a lower filament and sideways such as under filaments 82, 86, 84, and 88. The same tortuous path is provided for flow from the center of the cylindrical structure outwards.

FIG. 6 also shows the relationship of the winding angle and the geometry of the diamond shaped apertures defined by the layers of criss-crossing hollow filaments. The distance A is the circumferential distance between centers of visible adjacent hollow filament, i.e., filament forming the opposite side of the aperture. This distance is measured perpendicular to the axis of rotation of the mandrel on which the cylindrical structure was just formed from coated yarn. This distance is the product of an integer (usually two) and the circumference divided by the least common denominator of the ratio of mandrel revolutions and traverse cycles. For example, such ratio can be 153/23 and distance A is 1/23 of the circumference of the structure at the point of measurement. Examples of the least common denominators of such ratio are those from 21 to 300.

The minimum angle between the criss-crossing hollow filament winding on the mandrel and a plane normal to the axis of rotation of the mandrel is defined as the winding angle $\theta$ in FIG. 6. Preferably the winding angle is from 15° to 40°.

Distance B is the perpendicular distance between centerlines of visible adjacent filament, i.e., filament extending in the same direction and forming the opposite sides of the diamond shaped aperture. The ratio (B ratio) of distance B to the outside diameter of the hollow filament can vary from 0.1 to 2. Observance of this distance range means that said adjacent filament will be in overlapping relationship at the low end of the range and at the high end of the range, spaced apart by no more than the outside diameter of one filament. This overlapping or close spacing relationship, together with separation of the adjacent filament by criss-crossing filament and filament offsetting provides the tortuous paths in the network.

Figure 7:
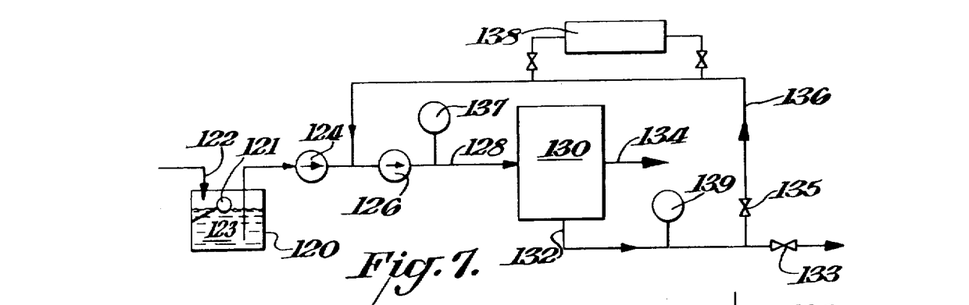
FIG. 7 shows schematically a pressure driven filtration system using a three-dimensional network of the present invention.

To illustrate the use of a unitary self-supporting structure of a network of hollow filaments of the present invention, FIG. 7 shows a system of a feed tank 120, an inlet line 122 for liquid 123, containing a material to be separated, and float control 121 for the inlet line. This liquid is pumped by a relatively low capacity pump 124 to a higher capacity circulating pump 126 and then through an inlet line 128 to a separation unit 130 containing such a network. The network by itself or together with a membrane on its surface has greater permeability for the liquid than for the material, in this case particulate solids, contained therein. Liquid which permeates through the wall of the hollow filament exits via line 134. The remaining liquid, which is a liquid concentrate of the original feed to unit 130, exits separately from the permeate via line 132. Line 136 forms a recycle loop for recycling all or a portion of the liquid exiting unit 130 via line 132. Whether the liquid in line 132 exits the system or is recycled and the extent of each is determined by valves 133 and 135. Heat exchanger 138 is used to control temperature of the recycled liquid if such control is necessary. For example, if a large portion of the liquid fed to unit 130 is recycled liquid, such liquid tends to be heated up by the pumping, and the heat exchanger can be used to cool down the recycle liquid. Pressure gauges 137 and 139 record the pressure of the liquid before and after, respectively, passing through the separation unit (through the thickness of the filament network).

Figure 8:
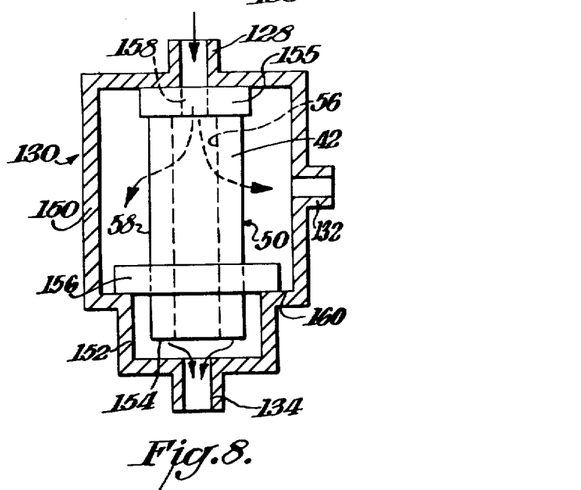
FIG. 8 shows schematically in side elevation one embodiment of the connection of the three-dimensional network into the system of FIG. 7 in greater detail.

One embodiment for disposition of the network of hollow filaments in such form as the cylindrical structure 50 within the separation unit 130 is shown in FIG. 8. More specifically, the separation unit 130 comprises a housing 150 having an inlet to line 128 for liquid containing the material to be separated, an outlet to line 134 for liquid permeate, and an outlet to line 132 for the remaining liquid. The liquid first enters the bore 56 of the cylindrical structure 50 or FIG. 5 disposed therein and then flows outwardly through the tortuous paths in the thickness dimension of the cylindrical structure. During this outward flow, liquid that permeates through the wall of the hollow filament flows along the interior passage thereof and empties into the stepped-down portion 152 of the housing 150, where such liquid permeate from all the open ends of hollow filament terminating in the stepped down portion 152 is collected and flowed to outlet 134. The hollow filament ends terminate and are open at end 154 of the cylindrical structure 50 by the structure having been cut in a plane perpendicular to the axis of the structure to expose the hollow interior of all hollow filament passing through the plane of cutting. The remaining liquid passes to the outlet to line 132.

The liquid feed into the housing 150 via line 128 is made to flow through the thickness of the cylindrical structure and is prevented from flowing directly out lines 132 and 134 by spaced potting regions 155 and 156 of epoxy resin extending through the entire thickness of the cylindrical structure 50 and from the exterior surface 58 thereof. Potting region 155 has a passage 158 therethrough communicating between inlet line 128 and the bore 56 of the cylindrical structure and is in sealing relationship (gasketing may be used) with the interior wall of the housing against which the potting region 155 abuts. Potting region 156 plugs the opposite end of the bore 56 and abuts the shoulder 160 of the housing 150 in sealing relationship. Thus, liquid fed into the housing 150 from inlet line 128 must be subjected to the separation action of the porous hollow filament making up the cylindrical structure 50 before exiting via lines 132 and 134. The same result would be obtained when the fluid is a gas instead of a liquid.

Potting through the thickness of the network can be obtained by standing the structure 50 upright and pouring a hardenable low viscosity resin into the bore of the cylindrical structure. The resin flows outwardly through the thickness of the structure 50 to also form the portion extending from the outer surface of the cylindrical structure.

Figure 9:
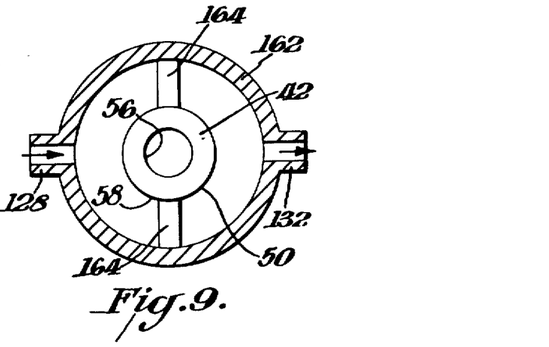
FIG. 9 shows schematically and in end view another embodiment of connection of the network into the system of FIG. 7.

In another embodiment, shown in FIG. 9, the cylindrical structure 50 is disposed within a housing 162 having an inlet line 128 for liquid which flows into the housing, through the thickness of the cylindrical structure 50, into its bore 56 and then through the opposite thickness of the cylindrical structure before reaching outlet line 132. Liquid is prevented from flowing around the exterior surface 58 of the cylindrical structure 50 by dams 164 which plug the space between the exterior surface 58 of the cylindrical structure and the housing 162 as shown in FIG. 9. The ends of the cylindrical structure 50 are potted with resin similar to FIG. 8 except that passageway 158 is omitted, and liquid permeate is collected in the same manner as in FIG. 8.

Figure 10:
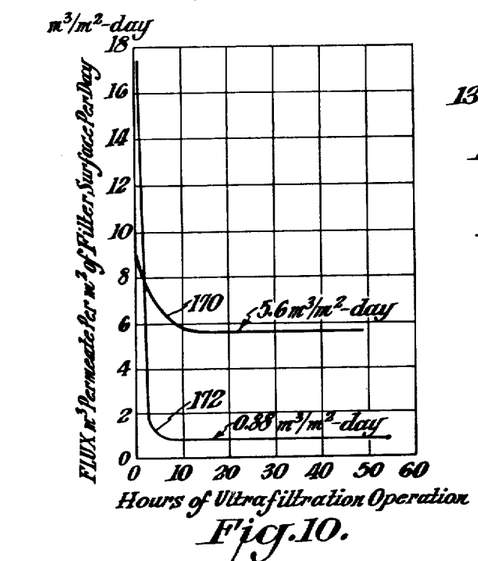
FIG. 10 shows a graph of the flux of a three-dimensional network of the present invention vs. that of commercially available straight ceramic tubes in ultrafiltration.

FIG. 10 shows a graph of flux performance for Wilmington, Delaware, U.S.A. city water of a three-dimensional network such as the cylindrical structure 50 vs. that of commercially available straight ceramic tubes. Curve 170 is of the present invention and curve 172 is of the straight ceramic tubes. Each curve is characterized by an initial sharp decrease in flux. The operating flux portion of these curves begins at about 15 and 6 hours for curves 170 and 172, respectively. Further description of the test conditions used will be given in Example 1. The present invention achieved an operating flux of more than six times that of the straight ceramic tubes without any increase in power per unit of permeate to pump the water through the separation unit.

Figure 11:
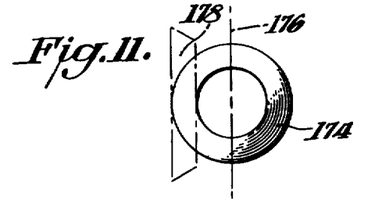
FIG. 11 shows in end view still another embodiment for making a three-dimensional network of the present invention.

The shape of the three-dimensional network can be varied as desired so long as it provides a thickness dimension which has tortuous paths for liquid flowing therethrough. For example, FIG. 11 shows an embodiment for making a flat three-dimensional network of hollow filament. A wound cylindrical structure 174 (shown in end view) of multiple layers of coated yarn such as made in FIG. 1 and prior to firing is split in a plane 176 corresponding to the centerline of the cylindrical structure 174. Each half of the cylinder can then be straightened out to the flat multi-layer trapezoidal shape 178 (only one shown) shown by dashed lines. The coated yarn criss-crosses from layer to layer and the coated yarn at each end of the flat shape (cylinder) runs from layer to layer to hold the layers together. This network structure is then fired in order to form porous hollow filament in the criss-cross pattern such as shown in FIG. 6. In plan view, this structure looks similar to FIG. 6 depending on the particular criss-cross winding pattern used. Since the hollow interior of the filaments are exposed when the coated yarn was cut, each slanted surface of the trapezoid will require potting such as in epoxy resin. The potting of one of these surfaces can then be cut again to reexpose the hollow interior of the hollow filament for the exit of liquid permeate therefrom, such potting also serving to isolate the fluid supply and concentrate from the filtrate such as in FIG. 8. In this embodiment, the cutting of the cylinder of coated yarn may result in lengths of hollow filament being loosely associated with the surface of the network after firing. The potting of portions of the network as just described binds all the lengths of hollow filament together into a flat unitary structure.

Figure 12:
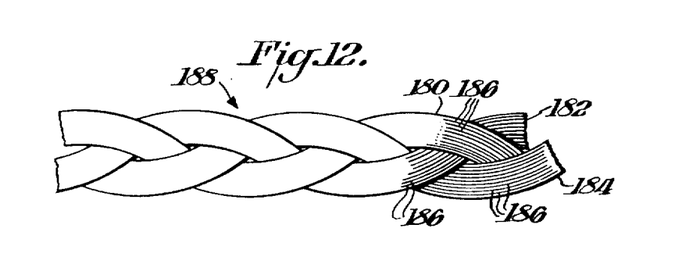
FIG. 12 shows in plan view and enlargement still another embodiment of three-dimensional network of the present invention.

The disposition of the rigid porous inorganic hollow filament in the network can be varied as desired so long as the tortuous paths for liquid flowing through the thickness dimension are provided. For example, FIG. 12 shows still another embodiment of three-dimensional network of hollow filament in which three bundles 180, 182, and 184 each of a plurality of hollow filaments 186 are intertwined in three dimensions into a braided structure 188. The braided structure can be made by bringing together a plurality of ends of coated yarn such as coated yarn 16 to form each bundle and then braiding these bundles of such yarn together, followed by firing. Braiding of the bundles together also results in the ends of coated yarn in each bundle becoming loosely twisted, which provides space for transverse liquid flow through each bundle. Multiple layers of braided structure 188 can be formed by a laydown on a reciprocating support 190 prior to the firing step such as showing in FIG. 13. Upon firing, the multiple layers of braided structure form a rigid unitary structure in which the layers are interconnected by the braided structure itself as shown in FIG. 13.

Figure 14:
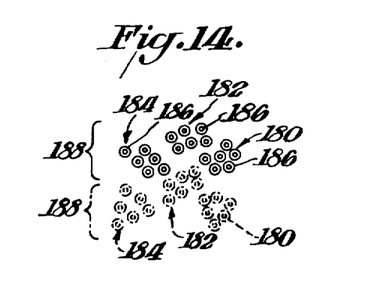
FIG. 14 shows a transverse cross-section of two layers of the embodiment of FIG. 12 nested together, one layer in solid lines and the other layer in phantom lines for clarity.

FIG. 14 shows a cross-section of two adjacent layers of braided structure 188, one layer in phantom lines, showing the nesting of such layers together that can be so obtained.

Figure 13:
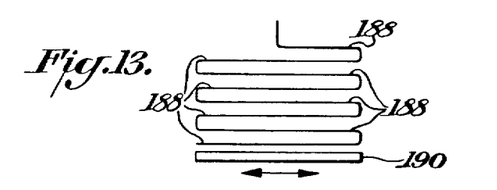
FIG. 13 shows schematically and in side elevation a method for making a multilayered three-dimensional network from the embodiment of FIG. 12.
Figure 15:
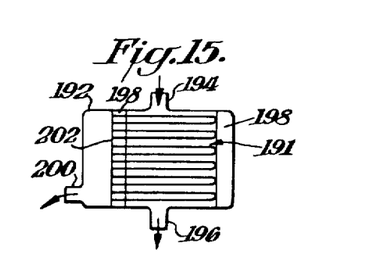
FIG. 15 shows schematically and in side elevation a multilayered network made according to FIG. 13 contained within a housing for separation application, with the front face of the housing being removed for clarity.
Figure 16:
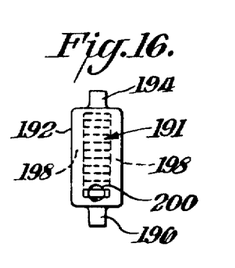
FIG. 16 shows an end view of the housing/network arrangement of FIG. 15.

An assemblage 191 of multiple layers of braided structure 188 made such as shown in FIG. 13 can be positioned within a housing 192 equipped with a top inlet opening 194 for liquid and a bottom outlet opening 196 for the liquid concentrate after having flowed through the thickness of the multiple layers as shown in FIG. 15. Epoxy resin dams 198 are provided around the sides of the multiple layers to prevent liquid from bypassing any of the layers as shown in FIGS. 15 and 16, and the housing 192 is equipped with an outlet opening 200 for filtrate flowing from the interior passages of the hollow filament opened by cutting the potted assemblage of layers of braided structure along line 202.

The key to success in making three-dimensional network of the present invention is the ability to form the structure of coated combustible core prior to firing. This requires a selection of materials and conditions for making the coated core and forming it into the network and for firing the coated core of the network to form the rigid inorganic hollow filament.

The principle component of the composition from which the hollow fliament is made is particulate inorganic material that is sinterable to a rigid mass. The resultant sintered product typically is a ceramic refractory material with a high melting point, preferably at least 1400° C. The refractory material may be an oxide, i.e., a single oxide or a mixture of oxides or oxide compounds, examples of which are $Al_2O_3$, mullite ($3Al_2O_3.2SiO_2$), $SiO_2$, cordierite ($2MgO.2Al_2O_3.5SiO_2$), MgO, spinel ($MgO.Al_2O_3$), forsterite ($2MgO.SiO_2$), and enstatite ($MgO.SiO_2$). The particulate inorganic material may be fine-grained powders of chemically inert material that will sinter with no changes in mineralogy or it may be a combination of fine-grained reactive materials such as clay or talc that will undergo decompositions, transformation and/or solid state reactions in order to produce the desired refractory material. "Sintering" is used herein to denote solid state reactions as distinguished from the formation of a liquid phase in order to arrive at the resultant rigid mass. The formation of a liquid phase involves obliteration of the original particle within a molten mass and the loss of porosity, which is not desired in the present invention.

The inorganic material particle size and distribution of sizes will determine the size of the pores between the particles in the sintered hollow filaments, which in turn will affect the impermeability of the filament wall to the matter to be separated from the liquid feed and hence, the particle sizes are selected accordingly. For the ultrafiltration application, the pores should be smaller than the largest particles to be filtered out but can be larger than the smallest particles to be filtered out. The largest particles bridge the pores in the hollow filament and in effect act as a filter aid or membrane on the outer surface of the hollow filament in filtering out smaller paticles from the liquid being filtered. In the case of reverse osmosis, the pore size in the wall of the hollow filament is selected to receive the membrane, whether of particulate material or continuous semi-permeable material, which is less permeable to the dissolved material in the liquid than to the liquid itself. The size of the pores in the filament wall generally increases with increase in particle size of the inorganic material. Generally, substantially all of the inorganic material will have a particle size of less than $20\mu$ and will have median particle size less than $10\mu$. The particles of inorganic material also give the sintered hollow filaments a surface roughness which is helpful in maintaining the filter aid on the surface of the hollow filament.

In addition to the inorganic material, the starting composition is in the form of a paste by having binder material present which gives the composition extrudability and holds the particles of inorganic material into a cohesive coating about the core. The choice of binder material will generally depend on the inorganic material selected. The binder material can be a liquid or a solid or semi-solid material which softens upon heating and can consist of a single material or a combination of materials. Examples of solid binder components include thermoplastic copolymers of ethylene/vinyl acetate and of ethylene/propylene/nonconjugated diene. These binder components are mixed with organic solvents such as perchloroethylene and toluene to plasticize the solid binder component to give the composition the rheology necessary for flowability around the combustible core and sufficient cohesion to remain intact during subsequent fabrication into a network. The binder material will generally be partly or wholly an organic material and hence will be correspondingly fugitive in the firing step. The resultant space left by burning off the fugitive binder from packed solid particles of inorganic material bound together by sintering provides the porosity to the hollow filament.

Typically, the starting composition will also contain a sintering aid which functions to assist the particles to sinter to a strong unitary polycrystalline body in the absence of chemical reaction between the refractory oxide particles themselves. When alumina or alumina silicate is the ceramic, talc, silica, silicone oil or grease, or ethyl silicate, or hydrated sodium silicate can be used as the sintering aid. Some sintering aids such as talc, silicone oil, and an organic binder solution serve to lubricate the composition to aid in its fabrication about the combustible core.

Generally, the composition will contain from 40 to 80 percent particulate inorganic material, 2 to 10 percent solid binder, 15 to 50% liquid plasticizer for the binder (premixed with the binder), to total 100%, all percents being by weight. When a sintering aid is used, it will be present in from 1 to 15 percent by weight based on the weight of the particulate inorganic material.

The particles of inorganic material, the binder and the sintering aid are blended together to achieve a viscosity of about $10^5$ to $10^7$ poises at a shear rate of about $10^{-2}$ sec.$^{-1}$ at 25° C., similar to a paste, for ram extrusion.

The combustible core coated with the composition is most expeditiously a textile yarn of staple or continuous filament such as of cotton, rayon, nylon, or acrylic, which are completely burned out during firing, i.e., no appreciable ash remains within the sintered hollow filament. The yarn should be compact to minimize any absorption of coating composition which could clog the hollow interior of the sintered filament. In this regard, the yarn can be coated to decrease such absorption. Compactness is also provided by the yarn being highly twisted, such as 2 to 8 turns/cm or by using monofilament yarn.

Fabrication of the coated yarn into the three-dimensional network structure is permitted by the flexibility of the coated yarn. Surprisingly, despite its small outside diameter and thinness of cating, the coating retains its envelope around the combustible core, i.e., the core does not poke through coating during fabrication even when the core is pulled through the extrusion die and wound around paired gripping rolls 20 and 21 as in FIG. 1. The core does not cut through the paste coating therearound and even remains substantially concentric within the coating. The fabrication can also involve traversing the coated yarn back and forth across a mandrel, which involves bending and curving of the coated yarn, which nevertheless does not rupture the coating. The traversing can be across a rotating mandrel to form a wound cylinder of the coated yarn or can be across a flat bed to form a flat assemblage of coated yarn. The three-dimensional network can be made of a single end of coated yarn or can be made of multiple ends. It is only desired that all the resultant hollow filament in all layers intersect a surface remaining after cutting across or through the three-dimensional network structure for the purpose of receiving the outflow of permeate from the interior by the hollow filament. Preferably, the hollow filament in the network runs at least to one end thereof, such as the end showing layers 52 in FIG. 5 and more preferably from end to end of the network, because usually the network will be opened (filaments cut to expose their interior) at one end of the network. This enables permeate to be collected from the interior of all hollow filaments and avoids "deep end" filament. In addition, the buildup of the coated yarn such as on the mandrel or plate need not be in distinct layers that extend through the width and length of the three-dimensional network. It is only preferred that the coated yarn, and thus the hollow filament obtained therefrom, be piled on top of one another in criss-cross fashion through the thickness of the network structure so as to provide structural integrity and tortuous paths for fluid flow through this thickness.

Preferably, when the method of forming the network of coated yarn is wound up on a mandrel, such windup is under constant tension and slight pressure is applied, such as by a roller bale, against each layer of coated yarn as it is laid down onto the mandrel. This compacts the winding, which provides structural integrity for handling and firing.

The three-dimensional network of coated yarn is preferably supported during firing to prevent sagging. When the support is a mandrel, it should allow for shrinkage of the network during firing. This can be accomplished by using a removable carboard sleeve over the windup mandrel and inserting a ceramic tube for horizontal support for firing or using a ceramic mandrel which includes a collapsible surface made for example of compressible ceramic fiber felt, e.g., Fiberfrax ® felt. After firing, the network is self-supporting.

The kiln temperature for firing is increased gradually to a maximum temperature and then gradually decreased for a total period of 10 to 13 hours; the maximum temperature is about 1200° to 1450° C. to sinter the coating to the rigid hollow filament. During the heat up, the binder and combustible yarn are burned out. The exact maximum temperature depends on the particular inorganic material present and the sintering aid present, if any, and in any event, is short of melting the particles of inorganic material which would reduce apparent porosity. Generally, the maximum temperature is selected at which the hollow filament exhibits maximum apparent porosity while meeting structural integrity requirements.

The resultant porous hollow filament is generally no more than 0.125 inch (3.18 mm) and preferably no more than 0.08 inch (2.03 mm) in outside diameter, and has a wall thickness of preferably no more than 0.03 inch (0.76 mm). More preferably, the filament has an outside diameter of no more than 0.06 inch (1.52 mm) and wall thickness of no more than 0.02 inch (0.51 mm). In any event, the size of the hollow filament is such that the filament is rigid in the sense that it cannot be straightened and unwound from the three-dimensional network such as the cylindrical structure 50. Thus, the size of these filaments distinguishes them from ceramic filaments that have been fired on a bobbin and then are unwindable therefrom such as disclosed in U.S. Pat. Nos. 3,808,015 and 3,986,528. Generally, the hollow filament in the present invention will have an outside diameter of at least 0.025 inch (0.64 mm) and wall thickness of at least 0.01 inch (0.25 mm).

The hollow filament also has a high apparent porosity, preferably at least 35% and more preferably at least 40%. The higher the apparent porosity, the higher is the flux of the hollow filament. Porosity, however, detracts from strength. Nevertheless, despite the high apparent porosity and brittle nature and light construction of the hollow filament, the filament has sufficient strength in the three-dimensional network to withstand high pressure differential across the filament wall, e.g., 2000 psi (13790 kPa), high liquid flow perpendicular to the filament axis, and high pulsations of pressure and flow, that can be encountered in operation. Generally, an apparent porosity of no greater than 60% is desirable because of the weakening of the filament wall.

The high apparent porosity previously described represents essentially complete utilization of the porosity present in the porous, hollow filament. In other words, the porosity present in the wall of the hollow filament is essentially all open and thereby available for fluid permeation. Closed cell porosity is disadvantageous because of the weakening effect the closed pores have on the filament without any filtration benefit.

Most preferably, the network of hollow filament has a packing of at least 300 ft$^2$/ft$^3$ (at least about 980 m$^2$/m$^3$) and has at least 10 ft$^2$ (at least about 0.9 m$^2$) of surface area.

The rigidity of the sintered hollow filaments provides corresponding rigidity and integrity to the three-dimensional network. This enables the network to be supported in a manner which provides maximum flux, namely, transverse to the direction of liquid flow and with a minimum of surface being used up for the purpose of supporting the network structure in the separation unit.

Even though the coated yarn is in contact with itself throughout the thickness of the three-dimensional structure during sintering, the hollow filaments are generally not bonded to their criss-crossing neighbors. This result was not to be expected from the prior disclosure of unwinding ceramic filament from a bobbin because of the larger diameter and thus larger area of contact between crossing coated yarn used in the present invention. Even the use of thermoplastic polymers in the binder component fails to cause the filament to sinter to itself.

Example 4 of U.S. Pat. No. 3,986,528 discloses the forming of a wound structure of ceramic multifilament yarn forming straight or smoothly curving nontortuous passages through the structure for the passage of auto exhaust, in which prior to bonding of the yarn together at crossover points, the wound structure is flexible and loose and can be unwound. These passages produce some turbulence in gaseous auto emissions in order to expose such emissions to catalyst but the passage of the emissions through the wound structure must be easy in order to minimize back pressure. Thus, these passages would not serve as tortuous paths for liquid such as water. Therefore, such a structure of U.S. Pat. No. 3,986,528 would be useless in the filtration application and bonding used to rigidify the structure to withstand the stress of exposure to the automobile exhaust in the patent has the disadvantage of adding to expense and detracting from surface available for filtration. Of course, no hint of making the filament hollow or how to do so is given. The absence of bonding between filaments in the three-dimensional network of the present invention provides maximum filament surface available for filtration.

Thus, even though the hollow filaments in contact with one another are not bonded together, the three-dimensional network still has rigidity and integrity. The lack of bonding between contacting filaments also has the advantage of providing toughness to the hollow filament, in enabling it to flex or shift slightly within the network in response to high stress rather than rupturing as could result if the filaments were immobile between cross-over points.

The three-dimensional network of the present invention is useful for filtering material such as fine particles from fluids, i.e., from gases or liquids, by the action of the pores in the wall of the hollow filament or the pores in a membrane formed on the surface of the filament being too small for the fine particles to pass through. Such a membrane has greater permeability for the liquid than the material contained therein. The network can also be used for reverse osmosis wherein the material to be separated is dissolved in the liquid, by the appropriate choice of membrane. An example of membrane is the membrane made of inorganic solid particles on the upstream surface of the hollow filament such as described in Thomas et al. cited hereinbefore. These solid particles fill in and reduce the size of the pores at the upstream surface of the hollow filament and are of the appropriate chemical composition to accomplish the separation desired.

Test Procedures

Packing of the hollow filament in the network is determined by calculating total surface area of the filament in the network from the outside diameter and total length of said filament and dividing this by the volume of the network as determined from its external dimensions. In the cane of a cylindrical structure, the volume would be determined from the length and outside diameter of the structure. The packing of commercial units of straight ceramic tubes, usally 20 to 50 thereof, in a housing is rated by the surface area of the tubes available for the separation application divided by the volume of the housing. If a comparison between packing achieved in the present invention with the aforesaid commercial units is desired, then the value for the volume of the network could be increased by the small amount corresponding to the housing that would be needed for the network.

The bulk density and apparent porosity are determined by the A.S.T.M. method C 373-72 with the modification of boiling the filament in water for two hours and letting it soak in water after boiling to cool to room temperature for an additional four hours.

Bulk density in grams/cubic centimeter (g/cm$^3$) is the quotient of the dry mass of a filament divided by its exterior volume, including open pores.

The apparent porosity expresses as a percentage, the relationship of the volume of the open pores of the filament to its exterior volume.

The density (absolute) of the solid material of a filament is determined on a finely crushed sample of the filament using a pyonometer and the procedure of A.S.T.M. method C 329-75.

The total porosity, P, expresses as a percentage the relationship of the volume of all pores (open and closed) of the filament to its exterior volume.

$$P = 100 \left( \frac{\text{absolute density} - \text{bulk density}}{\text{absolute density}} \right)$$

The modal pore diameter (microns, $\mu$), the pore volume per unit weight (cm$^3$/gram) and the surface area per unit weight (m$^2$/g) at 137,900 kPa (20,000 psi) pressure are obtained from standard mercury porosimetry methods. A sample is placed in a penetrometer (glass tube with graduated capillary stem). The penetrometer is placed in the filling device which is evacuated, permitting mercury to fill the penetrometer. This system of the porosimeter pressures the sample to atmospheric pressure, enabling measurement of pores from 100 to 17 microns in diameter. The penetrometer is then transferred to the pressure chamber where pressures to 413,700 kPa (60,000 psi) are applied. As pressure is increased, mercury is forced into progressively smaller pores and penetration is measured as changing electrical capacitance between a metal sleeve and the mercury column in the penetrometer stem. Sample weight, pressure readings, penetrometer readings and capacitance readings are used as input for computer calculations. The computer calculates for each pressure (a) the volume of mercury in the pores of the sample per unit weight of the sample, (b) the diameter (in microns) of the pores filled, and (c) the cumulative surface area calculated on the basis of right cylindrical pores. Part b above is calculated from the expression $$D = -4\phi \cos \theta / \text{pressure}$$

where $\phi$ is the surface tension of mercury (473 dynes/cm) and $\theta$ is the contact angle of mercury with the solid (140°). The computer plots volume of mercury/unit weight vs. diameter on a log scale using values of vol/wt corresponding to whole and half integer values in each decade obtained by linear interpolation. The pore volume (cm$^3$/g) of the sample is the difference between the volume/weight at 0.01 and 20 microns in diameter as read from the plot. The computer also plots the ratio of the change of volume/weight to the change in diameter (using the algorithm of Savitsky-Golay, Anal. Chem. 36, 1626) versus the diameter on a log scale. The modal pore diameter is the locus of the maximum of this plot.

The plug factor (PF) of a liquid is the decrease in flow rate through a standard filter after 15 minutes flow at room temperature under a constant pressure of 30 psi (207 kPa) expressed as a percentage of the initial flow rate. The filter is a 0.45 micron (opening) filter membrane (made by Millipore of Bedford, Mass 01236) and is mounted in a standard pressure filter holder. A minimum of two liters of liquid sample is used in this test.

Examples of the present invention, in which parts and percents are by weight unless otherwise indicated, are as follows:

EXAMPLE 1

A ceramic composition for extrusion was made of 75.4 parts of alumina particles (A-17 by Alcoa having a median particle size of 3.5 microns with 90% of the particles being less than 8 microns), 17 parts of a solution containing 12.5% of an ethylene vinyl acetate copolymer (typically 28% vinyl acetate, Elvax ® vinyl resin grade 265 by E. I. du Pont de Nemours & Co.) in perchloroethylene, 1.3 parts of a silicone oil (Dow Corning 550 fluid), and 6.4 parts of perchloroethylene blended in a mixer (Readco Heavy Duty Double Arm Mixer) and having a viscosity of about $10^6$ poises at 25° C.

The above composition at room temperature was extruded through a 1.52 mm diameter coating die having a 0.64 mm I.D. hollow tube centered in the die carrying a twisted cotton yarn of about 1250 denier (4 ends of 16 cotton count yarn).

The coated yarn was wound up at 25.9 meters/minute (m/min) in a criss-cross manner on a tube (2.5 cm O.D. covered with a 3.2 mm layer of polyethylene foam, a layer of polyethylene film and an outer layer of kraft paper) for about six minutes using a constant tension textile windup having the traverse linked to the tube drive by gears, the tube made 306/23 revolutions for each cycle (i.e., back and forth) of the traverse. The traverse cycle (back and forth) was 81.3 cm. Every other layer of coated yarn was in the same direction of wrap but was offset from one another to provide a tortuous path through the three-dimensional network structure. The bobbin of coated yarn was removed from the tube (and tube covers) and dried for 16 hours in the open air. The dry bobbin of coated yarn was then fired to 1400° C. (Orton PCE cone 14) over a ten-hour period in a tunnel kiln and cooled. The product was a 36.5 cm long cylinder (4.5 cm O.D. 2.5 cm I.D.) of a single end of hollow, alumina (substantially all $\alpha$-alumina) filament having an O.D. of 1.02 mm and I.D. of 0.38 mm and a packing of 794 m$^2$/m$^3$. The cylinder had a B ratio ranging from 0.4 to 1.1. The hollow filament had a bulk density of 2.362 g/cm$^3$, an absolute density of 3.77 g/cm$^3$, apparent porosity of about 43%, modal pore diameter of 0.32 microns, pore volume of 0.117 cm$^3$/g, and surface area of 1.89 m$^2$/g.

A 15.0 cm length of this cylinder was cut away from the remaining cylinder for use in the separation of impurities from water. One cut end of the cylinder was potted in epoxy resin to seal all filament ends, interfilament spaces, and the center (core) of the cylinder. A second potting near the other end of the cylinder provided a disc of resin with an outer rim that closed the core and sealed all interfilament spacing but not their open ends. The effective length of the cylinder, i.e., the length between seals was 1.90 cm. This provided about 200 fibers of 3.8 cm average length with a total outside area (effective area) of the hollow filament of 0.024 m$^2$. The potted cut cylinder (termed a "cartridge") was mounted in a housing as in FIG. 9 and used in an ultrafiltration system similar to FIG. 7.

The fluid used was city water (Wilmington, Delaware) having a plug factor of 95 supplied to a feed tank with a low capacity pump which fed a higher capacity circulating pump located in a circulating loop containing the filtration unit, heat exchanger and an outlet valve 133. The circulating pump forced water (at a rate of 38 liters/min) through the filtration unit. Flow rate through the outlet (i.e., bleeding) was 4–6 liters/min. The pressure before ($P_1$, gauge 137) and after ($P_2$, gauge 139) the filtration unit, the permeate flow (ml/min) and the quality of the permeate from the filtration unit as expressed by the plug factor were measured.

The unit was conditioned by operating for 18 hours at an average of the gauge pressures ($P_1$ and $P_2$) of 37.5 psi (259 kPa). Two grams of diatomaceous earth were then added to the feed tank and the average pressure increased to 41.5 psi (286 kPa). The permeate ran clear indicating that no cracks were present to permit leakage of the diatomaceous earth. After 19.5 hours operation, the pressure was changed to give $P_1/P_2$ of 27/20 psi (186/138 kPa).

The permeate flow decreased from 150 to 95 ml/min over the next 47.5 hour period with good rejection of the impurities as judged by the plug factors ranging from 9–36. The operating flux for this period of operation was 139 gal/ft$^2$-day (5.68 m$^3$/m$^2$-day) and is plotted as curve 170 in FIG. 10.

The power used in the filtration per unit volume of permeate per minute is proportional to the product of the pressure drop across the filtration unit ($P_1-P_2$) and the total flow into the unit divided by the permeate flow. The power was proportional to 19.2 per ml of permeate as determined by the calculation:

$$\frac{(186 - 138) \text{ kPa} \times 38 \text{ l/min}}{95 \text{ ml/min}}$$

For comparison, a commercial porcelain filter tube (O.D. 4.77 mm, I.D. 3.18 mm and 32.7 cm length) was mounted in a tube (I.D. about 7.9 mm) to provide axial flow of the liquid along the length of the tube and collection of permeate from the open end of the filter tube. The effective area of the tube was 0.0049 m$^2$, and the tube had an apparent porosity of about 39%, pore volume of 0.169 cc/g, modal pore diameter of 0.85μ, surface area of 1.449 m$^2$/g, bulk density 2.05 g/cm$^3$, and absolute density 2.92 g/cm$^3$.

City water was pumped through the filtration unit at a flow rate of 1.5 liters/min with recycling. This test was run in parallel with the first filtration unit but several days later than the above test.

Filtration was started at $P_1/P_2$ of 20/15 psi (138/103 kPa) and run for about six hours when the pressure was adjusted to $P_1/P_2$ of 27/21 psi (186/145 kPa) to give a permeate flow of 3 ml/min. This low flow equivalent to a flux of 21.6 gallons/foot$^2$-day (0.88 m$^3$/m$^2$-day) held constant for more than 48 hours. The permeate had a plug factor of 50 during this period which was only marginally acceptable.

The power used in the filtration was proportional to 20.5/ml of permeate as determined by the calculation:

$$\frac{(186 - 145) \text{ kPa} \times 1.5 \text{ l/min}}{3.0 \text{ m/min}}$$

Thus for about an equal consumption of power per ml of permeate, operation in accordance with the present invention produced a more than six-fold improvement in operating flux at no sacrifice in permeate quality.

In reporting this improvement, it is recognized that the commercial porcelain tube tested may not have been the best available for treatment with Wilmington city water. On the other hand, the hollow filament network of the present invention was not idealized for this purpose either. Also, the flux of the commercial porcelain tube might have been improved if the tube had a different pore size but such improvement in flux would have been at the expense of permeate quality which was already poor. A dynamic membrane might have been used to improve permeate quality of the commercial porcelain tube tested, but this would have decreased flux even further.

EXAMPLE 2

A cylinder of three-dimensional network of hollow alumina filament was made using the procedure of Example 1 but with a 1.14 mm diameter die and a 0.64 mm I.D. center tube using the following extrusion composition with the ingredients of Example 1 plus talc: 74.1% alumina, 17.0% of the resin solution, 6.3% perchloroethylene, 1.3% silicone oil, and 1.3% talc, having a viscosity at extrusion of about 10$^6$ poises at 25° C. The windup tube made 306/23 revolutions for each traverse cycle (81.3 cm). The cylinder had a B ratio of from 0.7 to 1.0. The hollow filament had an O.D. of 1.27 mm, an I.D. of 0.38 mm, a bulk density of 2.165 g/cm$^3$, an absolute density of 3.58 g/cm$^3$, an apparent porosity of about 43%, a modal pore diameter of 0.30 micron, a pore volume of 0.117 cm$^3$/g, and surface area of 1.90 m$^2$/g. The cylinder (4.5 cm O.D. and 2.5 cm I.D.) was fired as in Example 1.

Following the procedure of Example 1, a 15.0 cm length cut from the cylinder was potted in epoxy resin to give an exposed length of 1.9 cm and an effective filter area of 0.022 m$^2$ and packing of 728 m$^2$/m$^3$; the cartridge mounted in a housing as in FIG. 9 and that filtration unit connected to a fluid system.

The cartridge was tested for absence of cracks by pumping a 1% dispersion of colloidal silicon (particle size <0.1 micron) through the thickness of the cylinder at 64 liters/minute using a recycle loop and no bleeding for 57 hours to give the permeate flow at the end of the operation of 190 ml/min at $P_1/P_2$ of 34/27 psi (234/186 kPa) at 48° C. The permeate contained ca. 0.1% silica indicating 90% rejection and the absence of cracks. The silica dispersion was replaced with city water.

The system was operated continuously for a period of time in which conditions were sought which produced an acceptable flux. In this regard, results obtained at 75°–78° C. and 37 psi (255 kPa) over a period of five days seemed acceptable. The flux decreased from 12 to 11 m$^3$/m$^2$-day and the plug factor of the permeate collected at a rate ranging from 165 to 185 ml/min was from 16 to 30.

EXAMPLE 3

A cylinder of hollow filament was made by the procedure of Example 1 but using the extrusion composition of Example 2, a 1000 denier rayon yarn as the core and 170/21 revolutions of the windup tube for each traverse cycle (81.3 cm). The cylinder had a B ratio of from 1.0 to 0.7. The hollow filament had the same dimensions and physical properties as measured in Example 2.

A cut length of the cylinder was potted as in Example 1 to form a cartridge with an exposed length of 7.62 cm and an effective filtration area of 0.093 m$^2$ and packing of 767 m$^2$/m$^3$. The cartridge was mounted in a housing as in FIG. 9 and the resultant filtration unit connected in a flow system, to give radial flow through the cartridge with partial recirculation of the feed liquid.

City water (63° C.) was pumped through the system at a flow rate of 37.8 l/min. After about four hours the permeate flow was 230 ml/min to give a flux of 3.6 m$^3$/m$^2$-day (88 GFD) at $P_1/P_2$ of 24/14 psi (165/97 kPa). The water feed was replaced with a 3% solution of polyvinyl alcohol of molecular weight about 50,000 in city water and filtration continued. The permeate obtained at the rate of 110 ml/min contained essentially no polyvinyl alcohol as analyzed by refractive index. Flux was 1.7 m$^3$/m$^2$-day.

EXAMPLE 4

This example shows the use of a three-dimensional network of the invention with a dynamically-coated membrane to separate salt from its solution.

A cylinder of hollow fibers was made by the procedure of Example 1 with a slight modification of the ratio of the ingredients (75.9% alumina, 17.1% resin solution, 5.7% perchloroethylene and 1.3% silicone oil) using a 1.4 mm diameter die with a 1.07 mm I.D. tube to feed the 3000 denier yarn and 170/21 revolutions of the windup tube/traverse cycle (81.3 cm). The hollow filament (O.D. 1.27 mm, I.D. 0.38 mm) was believed to have about the same physical properties as measured in Example 1.

Following the procedure of Example 1, a 15 cm length cut from the cylinder was potted in an epoxy-polyamide resin to make a cartridge. The cartridge was mounted in a housing as in FIG. 9 except that dams 164 were omitted. This filtration unit was connected in a flow system containing a displacement pump, pressure accumulator and recirculation loop. The feed tank (32 liters) was filled with a slurry containing 240 g Nacl, 7.2 g $ZrOCl_2.8H_2O$ and 75.7 liters of distilled water adjusted to a pH of 4 with HCl. Flow through the system was started at a temperature of 20° C. with no bleed. During the first 2.5 hours at average pressure ranging from 250 to 950 psi (1723 to 6550 kPa) the following materials were added to the feed tank: 12 g of diatomaceous earth and 12 g of $ZrOCl_2.8H_2O$. At 2.5 hours 20 ml of a 25% aqueous solution of polyacrylic acid (molecular weight about 150,000) was added and flow continued. Sufficient NaCl was added to the feed tank to give 3.5% NaCl in the system. Conductivities of the feed and permeate were measured and the salt rejection directly calculated from them. At an average pressure of 950 psi (6550 kPa) the permeate (20 ml/min flow) showed a salt rejection of 38%.

Additional NaCl and distilled water were added to give 5% NaCl concentration and 10 ml of the polyacrylic acid solution added. The pressure accumulator was set to give ±200 psi (1380 kPa) surges of pressure at the average pressure used of 1450 psi (10,000 kPa). This yielded 20 ml/min of permeate having a salt rejection of 18%.

Additional NaCl was added to give 8.5% NaCl in the feed. At an average pressure of 1450 psi (10,000 kPa) the permeate (20 ml/min) showed a salt rejection of 9%.

pH of the feed increased from 3 with the 3.5% NaCl solution to 6 with the 8.5% solution.

In the course of the above demonstration the pressure surged to 2,000 psi (13,800 kPa) on one occasion without breaking the hollow filaments.

The above permeate flow was equivalent to a flux of 1.3 $m^3/m^2$-day (32 GFD) for the 1.9 cm long filter cartridge with an effective area of 0.022 $m^2$, and packing of 728 $m^2/m^3$.

This Example could have been carried with a warmer feed liquid such as would be encountered in hot climates, in which the feed liquid might be at 35° C., and this liquid would be heated such as to 45° C. by a long pumping path in the hot climate.

EXAMPLE 5

A ceramic composition for extrusion was made of 11.6 parts of alumina particles (A-16 SG by Alcoa having a median particle size of 0.5 micron with 90% of the particles being smaller than 1.3 micron), 22.6 parts of micronized talc, with a maximum particle size of 12 microns (Desertalc Mikro 707 by Desert Minerals, Inc.), 18.4 parts of a Kaolinite clay (Kaopaque K-10 by Georgia Kaolin Co. with a median particle size of 1.2 microns and 90% of the particles being smaller than 2.5 micron) and 47.4 parts of a copolymer solution containing 12.5% of the copolymer of Example 1 in perchloroethylene using the procedure of Example 1.

The above composition at room temperature was extruded around a cotton yarn using the apparatus and yarn of Example 1.

The coated yarn was wound up at 21.3 m/min for 3 min on a 23 cm long mullite tube of 2.5 cm O.D. wrapped with a refractory ceramic felt (Fiberfrax) to give an O.D. of 3.5 cm, using the apparatus of Example 1 modified to give 1547/150 revolutions of the tube for each traverse cycle (40.6 cm). The bobbin of coated yarn (and tube) was dried for sixteen hours in the open air and then fired (while suspended in a horizontal position) to 1200° C. (small cone 4) and cooled over a thirteen hour period in a tunnel kiln.

The product (removed from the tube) was a 19.7 cm long cylinder (5.1 cm O.D., 3.2 cm I.D.) of a single end of hollow ceramic refractory filament composed of cordierite, α-alumina, mullite and enstatite. The hollow filament had an O.D. of 1.5 mm, an I.D. of 0.4 mm, a bulk density of 1.542 $g/cm^3$, an absolute density estimated to be 3.1 $g/cm^3$, an apparent porosity of 55%, modal pore diameter of 0.80 microns, pore volume of 0.311 $cm^3/g$, and a surface area of 3.89 $m^2/g$.

The cylinder was potted in epoxy resin as in Example 1 to give an exposed length between the epoxy seals of 9.5 cm. This provided about 86 filaments of 38.1 cm average length with a total effective area of the hollow filament of 0.154 $m^2$. The packing of the network was 800 $m^2/m^3$. The cartridge was mounted in a housing as in FIG. 9 but without any dams (164) and used in the ultrafiltration system of Example 1 (FIG. 7). The system was operated at a flow rate of 38 liters/min through the filtration unit with the outlet valve 133 wide open. An initial test using a 1% dispersion of colloidal silica with an average pressure of 36 psi (248 kPa) showed 100% rejection of the silica from the filtrate (280 ml/min flow rate). Filtration was continued with a flow of city water into the feed tank. After 19.5 hours the average pressure was reduced to about 25 psi (172 kPa). At 44 hours the filtrate (120 ml/min) showed a plug factor of 22. A sample of filtrate after ninety hours operation had a plug factor of 12. The filtrate flow at this time (118 ml/min) was equivalent to a flux of 1.10 $m^3/m^2$-day (27 $gal/ft^2$-day).

EXAMPLE 6

Example 5 was repeated except as set forth hereinafter. The center tube for the cotton yarn was 0.51 mm I.D. and the windup on a 25 cm long×7 cm O.D. mullite tube wrapped with refractory ceramic felt was at a rate of 30.48 m/min to give a bobbin of 9.2 cm O.D. at 32.0 minutes of winding time at 1547/300 revolutions of the mullite tube for each traverse cycle (40.6 cm).

The bobbin of coated yarn was dried and then fired to 1250° C. (small cone 6) and cooled over a thirteen hour period in a tunnel kiln and the mullite tube and felt removed. The final product, was a cylinder 19.6 cm long, O.D. of 16.3 cm and I.D. of 8.6 cm. The surface area of the 975 m of filament (O.D. 1.4 mm, I.D. 0.6 mm) forming the product was 4.29 $m^2$ (46.2 $ft^2$). The packing of the product was 1049 $m^2/m^3$ (320 $ft^2/ft^3$).

The procedure of this Example can be followed using a smaller mandrel (mullite tube plus wrapping) to give a network of 14.7 cm O.D., 5.0 cm I.D. by 19.6 cm long with a packing of 1290 m$^2$/m$^3$.

Since many different embodiments of the invention can be made without departing from the spirit and scope thereof, it is to be understood that the invention is not to be limited except to the extent defined in the following claims.

What is claimed is:

1. A self-supporting, unitary cylindrical structure having a bore, consisting of rigid, porous, ceramic hollow filament having an outside diameter of at least 0.025 inch arranged in a three-dimensional network of criss-crossing hollow filament through the thickness dimension of the network, the criss-cross pattern of the hollow filament extending in the length-width dimensions, the three-dimensional network of said hollow filament defining tortuous paths for liquid communicating through the thickness dimension of the network.

2. The structure of claim 1 wherein said hollow filament is arranged in layers through said thickness dimension, with successive turns of the hollow filament in each layer being spaced from each other, the hollow filament in each layer crossing and being in contact with hollow filament in each adjacent layer, the hollow filament being out of register sufficiently through the thickness dimension to provide said tortuous paths.

3. The structure of claim 1 wherein said filament has an outside diameter of no more than 0.125 inch.

4. The structure of claim 1 wherein said hollow filament is free of bonding to itself.

5. The structure of claim 1 having a packing of at least 400 m$^2$/m$^3$.

6. The structure of claim 1 wherein said hollow filament is a polycrystalline refractory oxide.

7. The structure of claim 6 wherein said refractory oxide is selected from the group consisting of Al$_2$O$_3$, mullite, SiO$_2$, cordierite, MgO, spinel, forsterite, enstatite, or mixture thereof.

8. The structure of claim 1 wherein said hollow filament is made rigid by sintering.

9. The structure of claim 1 wherein said hollow filament has an apparent porosity of at least 35%.

10. The structure of claim 9 wherein said hollow filament has sufficient strength to withstand a pressure differential of at least 2000 psi.

11. The structure of claim 1 having a surface area of at least 10 ft$^2$.

* * * * *